May 27, 1924.
D. C. KLAUSMEYER
COMPACTED CHANGE GEAR
Filed Aug. 25, 1920
1,495,973
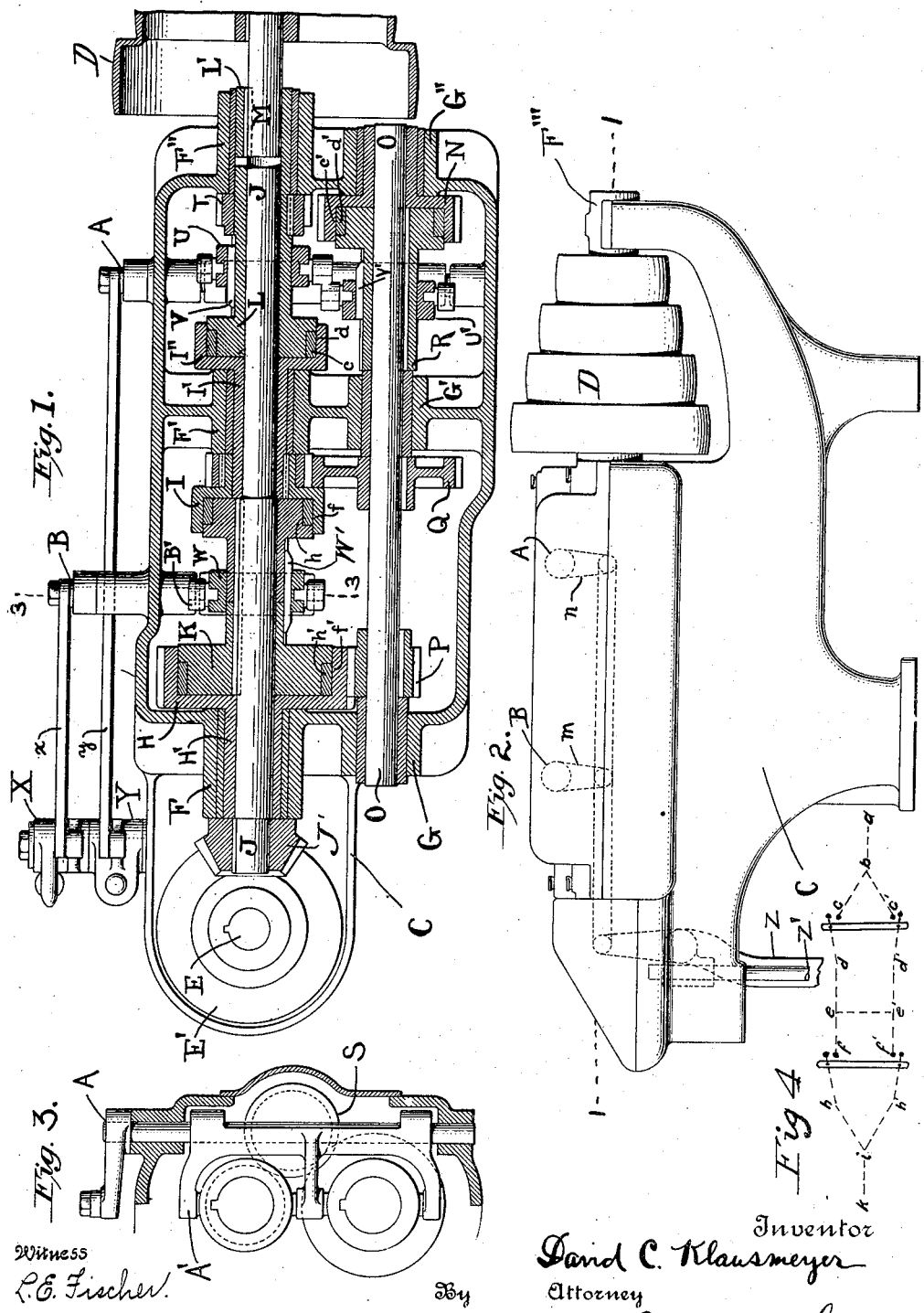
Inventor
David C. Klausmeyer
Attorney
Albert F. Nathan
Witness
L. E. Fischer Patented May 27, 1924.

1,495,973

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

COMPACTED CHANGE GEAR.

Application filed August 25, 1920. Serial No. 406,008.

*To all whom it may concern:*

Be it known that I, DAVID C. KLAUSMEYER, a citizen of the United States, and residing at Cincinnati, in the county of Hamilton and State of Ohio, have invented a new and Improved Compacted Change Gear, of which the following specification is a full disclosure.

This invention deals with an auxiliary improvement in machine tools and it refers more especially to a sub-combination in the nature of a speed-change mechanism for enabling the power to be transmitted either in a forward or a reverse direction or at a fast or a slow rate.

In general, the objective of this invention is to provide a mechanism of the foregoing nature characterized by compactness, fewness of parts, simplicity of arrangement, a minimum number of gears, and durability and efficiency in operation.

Other objects and advantages will be in part indicated in the following description and in part rendered apparent therefrom in connection with the annexed drawings.

To enable others skilled in the art to so fully apprehend the underlying features hereof that they may embody the same in the various ways contemplated by this invention, drawings depicting a preferred typical construction have been annexed as a part of this disclosure, and in such drawings like characters of reference denote corresponding parts throughout all the views, of which:—

Fig. 1 is a horizontal section taken through line 1—1 of Fig. 2. Fig. 2 represents the upper end of the column of a drilling machine incorporating this invention. Fig. 3 is a vertical section through line 3—3 of Fig. 1. Fig. 4 is a diagrammatic representation of the flow of motion in its different courses through the transmission system.

The transmission system underlying the structural embodiment of this invention will be more readily perceived by referring to the diagram depicted by Fig. 4. The clutches A and B may be operated independently; clutch A determining the direction of the motion transmitted to clutch B, and clutch B determining the ratio of transmission of the motion. These clutches are each so devised that, when the one side is closed to permit the flow of motion, the other side will be open; and conversely. If $a$ be regarded as the prime-mover, $k$ will be driven either fast or slow in either a forward or a reverse direction, depending upon which of the four possible combinations is resorted to, thus:

Forward—Fast $a$—$b$—$c$—$d$—$e$—$f$—$h$—$i$—$k$.

Forward—Slow $a$—$b$—$c$—$d$—$e$—$e'$—$f'$—$h'$—$i$—$k$.

Reverse—Fast $a$—$b$—$c'$—$d'$—$e'$—$e$—$f$—$h$—$i$—$k$.

Reverse—Slow $a$—$b$—$c'$—$d'$—$e'$—$f'$—$h'$—$i$—$k$.

It will be seen that when the motion flows from $e$ to $e'$ through the common branch-line $e$—$e'$, the motion is transmitted at a slow-forward rate, and when it flows conversely through this branch $e$—$e'$ (from $e'$ to $e$) the motion is transmitted at a reverse-fast rate.

The above outlined principle is adapted to be embodied in physical form in a very compact way whereby but seven gears are adequate for effecting these variations; thereby rendering available a speed-change mechanism peculiarly suitable for certain machine-tools such as power drills. One of the equivalent structural embodiments of this seven-gear principle is illustrated in Figs. 1 to 3 inclusive to which reference will now be made.

The working elements are arranged within a suitable casing C which is secured to an appropriate portion of the machine tool. In this instance, the power is received by a cone pulley D consisting of the steps D', D'', D''', etc., (affording a variety of initial speeds) and it is delivered to an appropriate shaft or spindle E which, in this instance, is in driving relation with a beveled gear E'. Between these working elements, either of which may be regarded as the driver, is the above analyzed speed-change mechanism. Referring to Fig. 1, it will be seen that the casing C provides four journal boxes, F, F', F'', and F''', all in co-axial alignment and spaced apart. The casing likewise provides three co-axially arranged other journal boxes, G, G' and G''. These boxes all contain suitable bushings of anti-friction metal. Journaled in the box F is a gear H, and journaled in the box F' is a gear I. These gears are each provided with sleeves H' and I', which, in turn, constitute bearings for a shaft J, which projects from one end of the casing and has keyed thereto a beveled gear J' in mesh with the gear E'. Keyed to this shaft so as to be supported thereby is a member K constituting a part of a double acting friction clutch. Journaled on the other end of this shaft J is a member L forming a part of a friction clutch; this member L being provided with a sleeve L' which extends beyond the extremity of the shaft J into the journal box F'''. A shaft M extends into the end of the sleeve L', where it is keyed thereto, and its opposite end is journaled in the box F''' and to its intermediate portion is splined the hub of the stepped pulley D. It will be perceived that, by this arrangement, a multiplicity of elements are each given ample bearing and supporting surfaces although arranged within a relatively narrow compass. A gear N is also journaled within the box G'' and an intermediate shaft O is journaled within the bore of the gear N and simultaneously in the journal boxes G and G'. This shaft O has keyed thereto a pinion P in mesh with the gear H and it likewise has keyed thereto a gear Q in mesh with the gear I. In this embodiment, the shaft O is shown supporting a member R which may be regarded as a supplement to member L, and which constitutes a part of a friction clutch. A gear S (see Fig. 3) is mounted on a stud extending from the end of the casing and is in mesh respectively with gears N and T. To obtain a forward low-speed drive, the clutches operated by shafts A and B are appropriately set: For example, shaft A controls a clutch organization for affording either a forward or reverse drive, and shaft B controls a clutch organization for varying the rate of the motion. In this instance, shaft A (see Fig. 3) carries a yoke-member A' controlling the positions of the collars U and U' which, in turn, determine the positions of wedge-bars V and V' which, in turn, expand the friction bands c and d' against the inner peripheries d and c' of the annular unit I'' and of the gear N, respectively. This constitutes a clutch mechanism of the friction type, such, for example, as that detailed in the Norris Patent No. 1,030,424, but, as the particular species of clutch is not a limiting characteristic of this invention, the illustration of a clutch mechanism is to be regarded as largely diagrammatic. When the shaft A is turned clockwise as viewed from Fig. 2, the clutch mechanism establishes a driving relation between the part L and the gear I, thereby causing the latter to rotate in the same direction as the shaft M. The shaft B has a yoke B' which controls the position of the collar W to which is secured the double acting wedge-bar W' which, in turn, expands either one or the other of the friction bands h and h'. Thus, when the shaft B is turned counter clockwise as viewed from Fig. 2, a driving relation is established between the part I and the clutch element K and, inasmuch as the latter is keyed to the shaft J, the latter is caused to rotate at a direct drive and in the same direction as a shaft M. In fact, with the clutches set as above described, the shaft J is virtually locked to the shaft M and is driven thereby without the necessity of causing power to be transmitted by gear teeth, thereby attaining a very high driving efficiency for the condition in which the drill will be most used.

Should it be desired to obtain a slower drive in a forward direction, it is now only necessary to turn the shaft B clockwise as viewed from Fig. 2 whereupon the engagement of the friction band h will be discontinued and the friction band h' will lock the gear H to the clutch element K so that the power will now be transmitted through the gear I to the gear Q thence to gear P through the shaft O and then to the gear H and through the element K to the shaft J. The ratios of the gears I, Q, P and H will determine the speed.

It is noted that the sleeve I' is a power transmitting element for the forward drives whether at a fast or at a slow rate. Whenever the reverse drive is desired, the member R is a power transmitting element, whether for the fast or the slow drive. To effect a reverse for either drive, the shaft A is moved counter clockwise as viewed from Fig. 2. This renders inoperative the friction band c and engages the friction band d' so that now the power is transmitted from the gear T through the idler S to the gear N and then to the part R which is keyed to the shaft O. From the shaft O the power is transmitted to the shaft J from either the gears H or I, depending upon which one is engaged.

For the purpose of operating the shafts A and B, any suitable mechanism may be employed. In the example illustrated, bell cranks X and Y are pivoted to the side of the casing and are connected with the shafts A and B, respectively, by links $x$ and $y$ and arms $m$ and $n$. These bell cranks X and Y are appropriately operated by suitable parts Z and Z' extending to any convenient portion of the machine.

Without further analysis, the foregoing will so fully reveal the gist of this invention that others can, by applying current knowledge, readily adapt it for various utilizations without omitting certain features that, from the standpoint of the prior art, fairly constitute essential characteristics of the generic or specific aspects of this invention, and therefore such adaptations should be and are intended to be comprehended within the meaning and range of equivalency of the following claims.

Having thus revealed this invention, I claim as new and desire to secure the following combinations of steps and elements, or equivalents thereof, by Letters Patent of the United States:

1. A speed and direction changing mechanism combining coaxially arranged driving and driven shafts; a third shaft parallel with said driving and driven shafts; two speed-controlling clutches and one direction controlling clutch carried by one of said coaxially arranged shafts; a direction controlling clutch carried by said third shaft; a single means for actuating both of said speed-controlling clutches; a clutch actuating yoke operatively connected with each of said speed-controlling clutches; means for shifting said yokes to actuate said speed-controlling clutches; gears carried by each of said clutches; two gears secured to said third shaft and permanently meshing with the gears on said speed-controlling clutches; and an idler gear permanently meshing with the gears of said two direction-controlling clutches.

2. A speed-change mechanism combining a casing having three aligned bearings; a sleeved member journaled in the first bearing; a second sleeved member journaled in the intermediate second bearing; a third sleeved member journaled in the third bearing; a shaft journaled in the sleeve of said first and second members and thereby supported against flexure by said intermediate bearing; a double acting clutch adapted operatively to connect either said first or said second member with said shaft; and another clutch mechanism adapted to operatively connect said second and third members.

3. A speed and direction changing mechanism combining a driving shaft; a driven shaft; a third shaft; three gears (H, I, T,) concentric with said driven shaft; three bearings (F, F', F'') for said driven shaft, each bearing being immediately adjacent one of said gears respectively; three gears (P, Q, N) concentric with said third shaft, two of the gears (P, Q) permanently meshing with two of the gears (H, I) of said driven shaft; three bearings for said third shaft; two speed controlling clutches and one direction controlling clutch carried by said driven shaft; a direction controlling clutch carried by said third shaft; an idler gear permanently connecting one of the gears (T) of said driven shaft and one of the gears (N) of said third shaft; and means for actuating the speed and direction controlling clutches to selectively drive the driven shaft (1st) forwardly at the same speed as the driving shaft, (2nd) forwardly at a reduced speed (through I'', I, Q, P, H, K); (3rd) reversely at substantially the same speed as the driving shaft (through T, S, N, O, Q, I, K) and (4th) reversely at a substantially reduced speed (through T, S, N, O, P, H, K).

4. A machine tool combining a casing; a toothed driving-member L; a midway gear I coaxial therewith; a clutch therebetween; a gear N driven through an idler S from said member L; a first gear Q coaxial with gear N and meshing with gear I; another clutch for connecting gear Q in driven relation with gear N; a gear coaxial with gear I and another gear coaxial with gear Q; a driven member J; and clutch-mechanism adapted to enable the driven member to derive its motion either through one or the other of the last-mentioned gears or directly from gear I when the latter is directly driven by the driving element.

In witness whereof, I hereunto subscribe my name as attested by the two subscribing witnesses.

DAVID C. KLAUSMEYER.

Witnesses:
C. C. SLETE,
ANNA M. HUSSIAN.